(12) United States Patent
Cooke

(10) Patent No.: US 6,790,653 B2
(45) Date of Patent: Sep. 14, 2004

(54) BIOLOGICAL FILTER APPARATUS WITH MULTIPLE FILTER UNITS

(75) Inventor: James A. Cooke, Beaverton, OR (US)

(73) Assignee: Bio-Reaction Industries, LLC, Tualatin, OR (US)

( * ) Notice: Subject to any disclaimer, the term of this patent is extended or adjusted under 35 U.S.C. 154(b) by 42 days.

(21) Appl. No.: 10/290,900

(22) Filed: Nov. 8, 2002

(65) Prior Publication Data

US 2003/0232424 A1 Dec. 18, 2003

Related U.S. Application Data

(63) Continuation-in-part of application No. 09/938,478, filed on Aug. 23, 2001, now Pat. No. 6,479,276.

(51) Int. Cl.[7] ................................................. C12M 1/00
(52) U.S. Cl. ................................. 435/294.1; 435/297.1; 435/821; 210/151; 96/122; 96/135
(58) Field of Search ............................. 435/262.5, 266, 435/294.1, 297.1, 821; 210/615, 617, 620, 151, 295, 314, 316; 96/121, 122, 131, 135

(56) References Cited

U.S. PATENT DOCUMENTS

| | | | | | |
|---|---|---|---|---|---|
| 5,480,538 | A | * | 1/1996 | McCombs et al. | 210/151 |
| 5,861,303 | A | * | 1/1999 | Barshter et al. | 435/266 |
| 6,069,004 | A | * | 5/2000 | Teramachi et al. | 435/292.1 |
| 6,168,711 | B1 | * | 1/2001 | Teramachi et al. | 210/123 |
| 6,479,276 | B1 | * | 11/2002 | Thom et al. | 435/266 |

* cited by examiner

*Primary Examiner*—David A. Redding
(74) *Attorney, Agent, or Firm*—John Smith-Hill; Smith-Hill and Bedell

(57) ABSTRACT

Air laden with biodegradable volatile organic compounds is passed sequentially through a first filter bed containing a biologically inert filter media, a second filter bed containing a biologically active filter media, and a third filter bed containing a biologically inert filter media. Water is present in the biologically active filter media and the biologically inert filter media. Water that drains from the second filter bed is collected and supplied to the first filter bed. Water that drains from the third filter bed is collected and recirculated to the third filter bed.

8 Claims, 1 Drawing Sheet

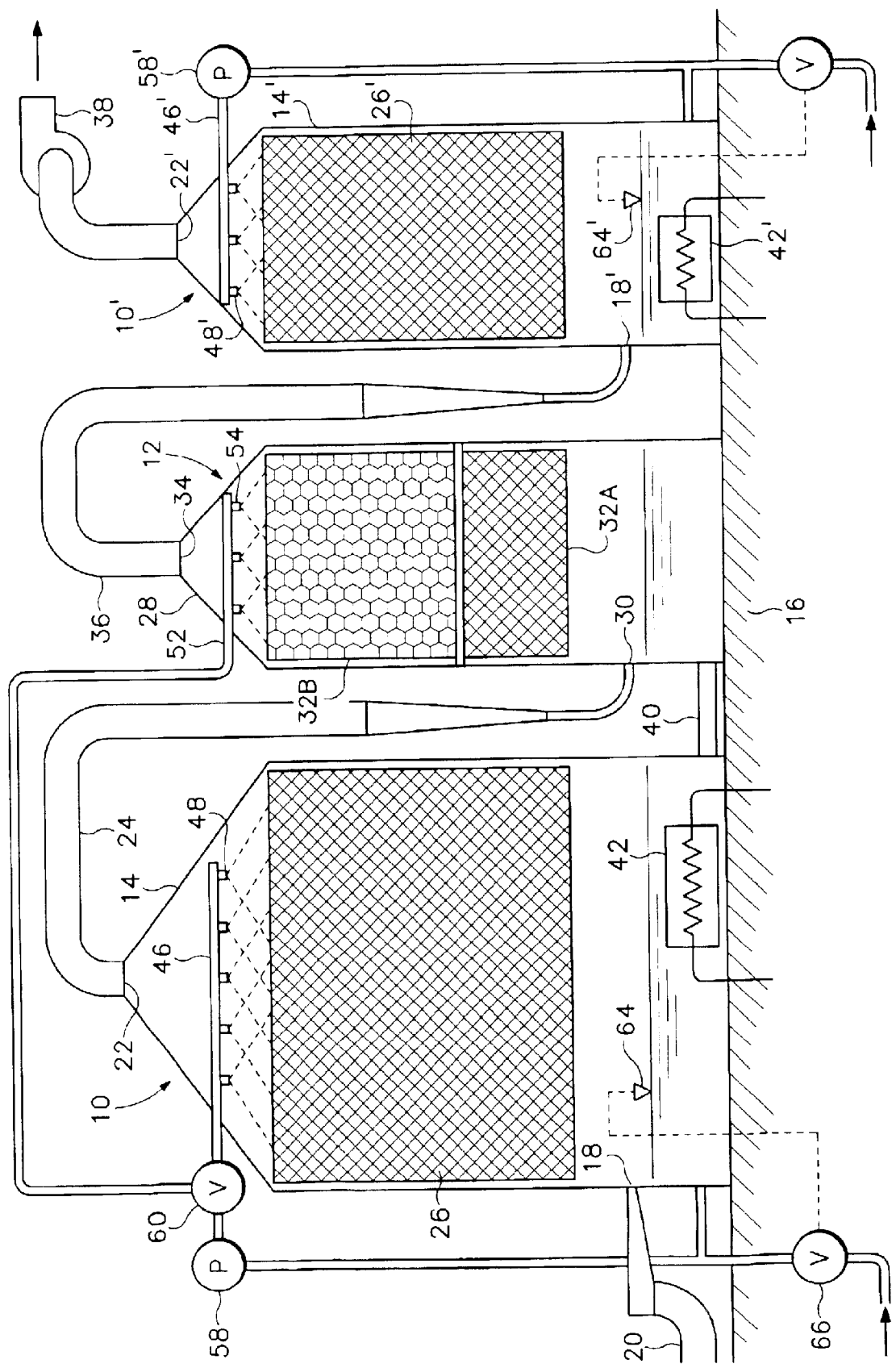

BIOLOGICAL FILTER APPARATUS WITH MULTIPLE FILTER UNITS

CROSS-REFERENCE TO RELATED APPLICATION

This application is filed as a continuation-in-part of copending patent application Ser. No. 09/938,478 filed Aug. 23, 2001 now U.S. Pat. No. 6,479,274 B1 and claims benefit thereof.

BACKGROUND OF THE INVENTION

This invention relates to a biological filter apparatus with multiple filter units, and to a method of operating a biological filter apparatus.

The copending application, the entire disclosure of which is hereby incorporated by reference herein, discloses a biological filter apparatus that comprises a trickling filter unit and a biological filter unit. The tricking filter unit includes a biologically inert filter bed whereas the biological filter unit includes a filter bed that contains organic compost containing a population of microorganisms that have an affinity for volatile organic compounds (VOCs) and consume VOCs and nutrients present in the compost. Each filter unit includes a spray tube for spraying water onto the filter bed. The water passes downwards through the filter beds and is collected in sumps beneath the two filter beds respectively. The sumps of the two filter units are in fluid communication, and water is drawn from the sump of the trickling filter unit for spraying onto both the inert filter bed and the biologically active filter bed. Because the two sumps are in fluid communication, the water that is sprayed onto the inert filter bed contains compost that has eroded from the biologically active filter bed. Accordingly, the inert filter bed is inoculated with microorganisms from the biologically active filter bed. Air laden with VOCs passes upwards through the trickling filter unit and then passes upwards through the biologically active filter unit. The inoculum in the inert filter bed metabolizes water soluble VOCs, such as certain alcohols, present in the feed air stream, thus reducing the concentration of water soluble VOCs in the air stream before it reaches the biofilter. In this manner, the population of microorganisms in the biologically active filter bed becomes conditioned to remove the water insoluble VOCs.

SUMMARY OF THE INVENTION

In accordance with a first aspect of the invention there is provided a filter apparatus for processing air laden with volatile organic compounds, the apparatus comprising a first filter unit defining a first filter chamber and having a first air inlet for admitting air into the first filter chamber and a first air outlet for exhausting air from the first filter chamber, a second filter unit defining a second filter chamber, a second air inlet for admitting air into the second filter chamber and a second air outlet for exhausting air from the second filter chamber, a third filter unit defining a third filter chamber, a third air inlet for admitting air into the third filter chamber and a third air outlet for exhausting air from the third filter chamber, the third inlet being connected to the second air outlet, a biologically inert filter media in the first filter chamber, a biologically active filter media in the second filter chamber, and a biologically inert filter media in the third filter chamber, whereby air passing through the apparatus passes sequentially through the first biologically inert filter media, the biologically active filter media and the second biologically inert filter media.

In accordance with a second aspect of the invention there is provided a method of processing air laden with biodegradable VOCs, said method comprising (a) passing the air sequentially through first, second and third filter beds, the first and third filter beds each containing a biologically inert filter media and the second filter bed containing a biologically active filter media, (b) collecting water that drains from the first and second filter beds, (c) supplying water collected in step (b) to at least one of the first and second filter beds, (d) collecting water that drains from the third filter bed, and (e) supplying water collected in step (d) to the third filter bed.

In accordance with a third aspect of the invention there is provided a filter apparatus for processing air laden with volatile organic compounds, said apparatus comprising a first wall means defining first, second and third filter chambers, a first air inlet for admitting air to the first filter chamber, a first air outlet for exhausting air from the first filter chamber, a second air inlet, connected to said first air outlet, for admitting air leaving the first filter chamber to the second filter chamber, a second air outlet for exhausting air from the second filter chamber, a third air inlet, connected to said second air outlet, for admitting air leaving the second filter chamber to the third filter chamber, and a third air outlet for exhausting air from the third filter chamber, a biologically inert filter media in the first filter chamber, a biologically active filter media in the second filter chamber, a biologically inert filter media in the third filter chamber, a first water supply means for supplying water to an upper region of at least one of the first and second filter chambers, a second wall means defining a first sump for receiving water from a lower region of at least one of the first and second filter chambers, a first recirculation means for feeding water from the first sump to the first water supply means, a second water supply means for supplying water to an upper region of the third filter chamber, a third wall means defining a second sump for receiving water from a lower region of the third filter chamber, and a second recirculation means for feeding water from the second sump to the second water supply means.

BRIEF DESCRIPTION OF THE DRAWINGS

For a better understanding of the invention, and to show how the same may be carried into effect, reference will now be made, by way of example, to the accompanying drawings, the single figure of which is a schematic sectional view of a filter embodying the present invention.

DETAILED DESCRIPTION

The filter shown in the drawing comprises two trickling filter units 10, 10' and a biological filter unit 12. Except as specifically pointed out below, the trickling filter unit 10' is essentially the same as the trickling filter unit 10 and accordingly it is not necessary to describe the structure of the trickling filter unit 10' in detail. Unprimed reference numerals are used to designate elements of the trickling filter unit 10 and the corresponding primed reference numerals are used to designate the corresponding elements of the trickling filter unit 10'.

The trickling filter unit 10 includes a housing 14 resting on a floor 16. The housing 14 has an inlet opening 18 and an air supply duct 20 connects a space that contains air laden with VOCs to the inlet opening 18. The housing 14 has an outlet opening 22 connected to a duct 24.

The housing 14 contains a support grid (not specifically shown) above the inlet opening 18. A biologically inert filter bed 26 composed of a cross flow filter media rests on the support grid. The cross flow media is made of corrugated sheets of synthetic polymer material. The corrugated sheets are bonded together in face-to-face relationship with the channels of alternate sheets inclined to each other at about 60°. One suitable form of material is commercially available from Brentwood Industries, Inc. of Reading, Pa The cross flow media is oriented with the sheets generally vertical so that the channels pass upwards within the filter bed 26 and are inclined at about 30° to vertical.

The biological filter unit 12 includes a housing 28 resting on the floor 16 and having an inlet opening 30 at about the same height as the inlet opening 18 of the housing 14. The duct 24 is connected to the inlet opening 30. The housing 28 has an outlet opening 34 which is connected by a duct 36 to the inlet opening 18' of the housing 14'. The outlet opening 22' of the housing 14' is connected to the suction side of a blower 38.

The housing 28 is provided with a support grid (not specifically shown) above the inlet opening 30 and a filter bed 32 rests on the support grid. The filter bed 32 is a composite bed that includes a lower bed 32A of biologically inert cross flow media and an upper bed 32B of biologically active filter media. Preferably, the biologically active filter media is composed of compost balls made in the manner described in co-pending patent application Ser. No. 09/938,466 filed Aug. 23, 2001, the entire disclosure of which is hereby incorporated by reference herein for all purposes.

The inlet opening 18 of the housing 14 and the inlet opening 30 of the housing 28 are positioned at a significant height above the floor 16. The housing 14 is connected to the housing 28 by a tie line 40 which is only slightly above the floor 16 and is well below the inlet openings 18 and 30. Accordingly, the housing 14 provides a scrubber sump below the inlet opening 18 for collecting water that drains from the filter bed 26 and the housing 28 provides a filter sump below the inlet opening 30 for collecting water that drains from the filter bed 32, the two sumps being connected by the tie line 40. The scrubber sump is provided with a thermostatically-controlled electrical resistance heater 42 for heating the water in that sump.

A spray tube 46 is mounted in the housing 14 above the filter bed 26 and is provided with nozzles 48 for spraying water onto the filter bed 26. Similarly, a spray tube 52 is provided in the housing 28 above the filter bed 32 and is provided with nozzles 54 for spraying water on the filter bed 32. A water pump 58 has its suction side connected to the scrubber sump and its pressure side connected to the spray tubes 46 and 52 by way of a proportioning valve 60 which distributes the flow provided by the pump between the spray tubes 46 and 52. A level detector 64 detects whether the free surface of liquid in the scrubber sump is below a nominal maximum level and controls a valve 66 connecting a source of water under pressure to the scrubber sump.

The housing 14' provides a polisher sump below the inlet opening 18' for collecting water that drains from the filter bed 26'. A pump 58' has its suction side connected to the polisher sump and its pressure side connected to the spray tube 46'.

In operation of the apparatus shown in FIG. 1, the blower 38 induces a flow of air laden with VOCs through the duct 20, the housing 14, the duct 24, the housing 28, the duct 36 and the housing 14', the pump 58 draws warm water from the scrubber sump and sprays the water onto the two filter beds 26 and 32, and the pump 58' draws water from the polisher sump and sprays the water onto the filter bed 26'.

The warm water trickling down through the filter bed 26 scrubs the air flowing upward through the filter bed 26. This action conditions the upward flow of air by warming and humidifying it. Moreover, water soluble VOCs, such as certain alcohols and ketones, dissolve in the water and are thereby removed from the air stream. Some of the water sprayed onto the filter bed 26 is retained in depressions or pockets formed in the flanks of the corrugations of the cross flow media. VOCs present in the water are metabolized by the inoculum in the cross flow media.

The conditioned air that leaves the housing 14 through the outlet opening 22 passes through the duct 24 and enters the housing 28 through the inlet opening 30. The air flows upwards through the lower filter bed 32A, which serves to distribute the flow over the cross-sectional area of the housing 28, and the air then flows upwards through the upper filter bed 32B. Microorganisms present in the filter bed 32B capture and consume biodegradable VOCs present in the air entering the filter bed 32B and convert them to non-toxic form, typically carbon dioxide and water. Accordingly, the biofilter unit 12 removes biodegradable VOCs from the feed air flow and supplies an outlet air flow having a substantially lower concentration of biodegradable VOCs than the feed air flow.

The filter bed 32B is maintained in favorable condition for the population of microorganisms by the warm water that is sprayed onto the filter bed from the spray tube 46.

The pump 58 sprays water onto the filter bed 26 and the filter bed 32 at a rate that exceeds the rate of evaporation from the respective beds, so that water drains from the filter beds 26 and 32 into the scrubber sump and the filter sump respectively. Since the sumps are connected by the tie line 40, when water is drawn from the scrubber sump, replacement water flows into the scrubber sump from the filter sump.

Considerable evidence suggests that in normal operation of a biofilter to remove water insoluble VOCs from an air stream, the biofilter will emit water soluble VOCs into the air stream. Accordingly, although operation of the biological filter unit 12 removes water insoluble VOCs from the air stream, it may in fact increase the concentration of water soluble VOCs in the air stream. The trickling filter unit 10' is employed to remove water soluble VOCs from the air stream leaving the biological filter unit 12.

The solubility in water of a water soluble VOC depends on the concentration of that water soluble VOC in the water. Since the water that accumulates in the scrubber sump contains water soluble VOCs removed from the inflowing air stream, it is desirable that the water supplied to the spray tube 46' not be drawn from the scrubber sump. Accordingly, the polisher sump, from which the pump 58' draws water for supply to the spray tube 46', is not connected to the scrubber sump and the water that circulates in the filter unit 10' is effectively isolated from the water circulating the units 10 and 12.

Even though the water circulating in the trickling filter unit 10' is effectively isolated from the water circulating in the filter units 10 and 12, microorganisms that are carried over from the filter unit 12 in the air stream, as well as microorganisms present in the ambient air, provide a sufficient population of microorganisms in the filter unit 10' for effective biodegradation of water soluble VOCs.

During normal operation of the filter shown in the drawing, the concentration of soluble VOCs in the feed air stream to the filter unit 12 is fairly low and accordingly the population of microorganisms in the filter bed 32 becomes habituated to removal of water insoluble VOCs. In the event of a surge in concentration of water soluble VOCs, the air stream flowing from the filter unit 12 will contain an increased concentration of water soluble VOCs, and these excess water soluble VOCs will be removed by the filter unit 10'.

Since the purpose of the filter unit 10' is to remove excess water soluble VOCs that are not removed by the filter unit 10 and any water soluble VOCs that are generated in operation of the filter unit 12, the filter unit 10' may be smaller than the filter unit 10.

As in the case of the copending application, the filter beds 26 and 32B may be installed in a common housing. Although it would in principle be possible to install the filter bed 26' in the same housing as the filter beds 26 and 32B, so that the air flow passes upwardly through the housing and traverses the three filter beds sequentially, and to collect water that drains from the filter bed 26' before it falls onto the filter bed 32B, is it preferred that the filter bed 26' be installed in a separate housing from the filter beds 26 and 32B.

The drawing illustrates the trickling filter unit 10 connected to the ducts 20, 24 so that the feed air stream flows upwards through the filter bed 26, counter to the water trickling downwards through the filter bed. The counter flow of the air and water results in efficient humidification of the air stream. It is in fact possible that the quantity of water taken up by the air stream and carried over to the filter unit 12 would saturate the biological filter media and impair the operation of the filter unit 12. In order to guard against this possibility, it may be preferred to connect the ducts 20, 24 to the trickling filter unit 10 so that the feed air stream flows downwards through the filter bed 26.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A filter apparatus for processing air laden with volatile organic compounds, the apparatus comprising:
   a first filter unit defining a first filter chamber and having a first air inlet for admitting air into the first filter chamber and a first air outlet for exhausting air from the first filter chamber,
   a second filter unit defining a second filter chamber, a second air inlet for admitting air into the second filter chamber and a second air outlet for exhausting air from the second filter chamber,
   a third filter unit defining a third filter chamber, a third air inlet for admitting air into the third filter chamber and a third air outlet for exhausting air from the third filter chamber, the third inlet being connected to the second air outlet,
   a biologically inert filter media in the first filter chamber,
   a biologically active filter media in the second filter chamber, and
   a biologically inert filter media in the third filter chamber, whereby air passing through the apparatus passes sequentially through the first biologically inert filter media, the biologically active filter media and the second biologically inert filter media and wherein the second filter unit defines a first sump for receiving water from a lower region of the second filter chamber and the third filter unit defines a second sump for receiving water from a lower region of the third filter chamber, and the apparatus comprises a first recirculation means for feeding water from the first sump to an upper region of at least one of the first and second filter chambers and a second recirculation means for feeding water from the second sump to an upper region of the third filter chamber.

2. A filter apparatus for processing air laden with volatile organic compounds, said apparatus comprising:
   a first wall means defining first, second and third filter chambers, a first air inlet for admitting air to the first filter chamber, a first air outlet for exhausting air from the first filter chamber, a second air inlet, connected to said first air outlet, for admitting air leaving the first filter chamber to the second filter chamber, a second air outlet for exhausting air from the second filter chamber, a third air inlet, connected to said second air outlet, for admitting air leaving the second filter chamber to the third filter chamber, and a third air outlet for exhausting air from the third filter chamber,
   a biologically inert filter media in the first filter chamber,
   a biologically active filter media in the second filter chamber,
   a biologically inert filter media in the third filter chamber,
   a first water supply means for supplying water to an upper region of at least one of the first and second filter chambers,
   a second wall means defining a first sump for receiving water from a lower region of at least one of the first and second filter chambers,
   a first recirculation means for feeding water from the first sump to the first water supply means,
   a second water supply means for supplying water to an upper region of the third filter chamber,
   a third wall means defining a second sump for receiving water from a lower region of the third filter chamber, and
   a second recirculation means for feeding water from the second sump to the second water supply means.

3. A filter apparatus according to claim 2, wherein the first supply means supplies water to upper regions of both the first filter chamber and the second filter chamber.

4. A filter apparatus according to claim 3, wherein the first sump receives water from both a lower region of the first filter chamber and a lower region of the second filter chamber.

5. Apparatus according to claim 2, wherein the first wall means comprises first, second and third housings defining the first filter chamber, the second filter chamber and the third filter chamber respectively, and the second wall means defines two sump regions for receiving water from a lower region of the first filter chamber and a lower region of the second filter chamber respectively.

6. Apparatus according to claim 2, comprising a means for introducing water to the second sump for maintaining the free surface of water in the second sump at a predetermined level and wherein the third air inlet is above the predetermined level.

7. Apparatus according to claim 2, wherein the biologically inert filter media is a cross flow media.

8. Apparatus according to claim 2, wherein the first wall means comprises an upper region of a housing defining both the first chamber and the second chamber, the first chamber being below the second chamber, and the second wall means comprises a lower region of the housing.

* * * * *